United States Patent [19]
Ishii et al.

[11] Patent Number: 5,658,984
[45] Date of Patent: Aug. 19, 1997

[54] PERMANENT ANTI-STATIC POLYCARBONATE RESIN COMPOSITION

[75] Inventors: Kazuhiko Ishii; Goro Shimaoka; Michio Nakata, all of Kanagawa-ken, Japan

[73] Assignee: Mitsubishi Engineering-Plastics Corporation, Tokyo, Japan

[21] Appl. No.: 575,259

[22] Filed: Dec. 21, 1995

[30] Foreign Application Priority Data

| Dec. 22, 1994 | [JP] | Japan | 6-335420 |
| Dec. 22, 1994 | [JP] | Japan | 6-335421 |
| Jan. 19, 1995 | [JP] | Japan | 7-023295 |
| Jan. 20, 1995 | [JP] | Japan | 7-024469 |

[51] Int. Cl.$^6$ .................................. C08G 63/48
[52] U.S. Cl. .................. 525/66; 524/504; 524/505; 524/514; 524/522; 525/63; 525/89; 525/90; 525/92 A; 525/133; 525/148; 525/179
[58] Field of Search ................. 525/133, 148, 525/66, 166, 179, 63, 89, 90, 92 A, 92 B; 524/504, 505, 514, 522

[56] References Cited

U.S. PATENT DOCUMENTS

| 5,338,795 | 8/1994 | Fukumoto et al. | 525/66 |
| 5,500,478 | 3/1996 | Fukumoto et al. | 525/66 |

FOREIGN PATENT DOCUMENTS

| 62-273252 | 9/1987 | Japan . |
| 1-163252 | 1/1989 | Japan . |
| 5-222140 | 8/1993 | Japan . |
| 7-026131 | 1/1995 | Japan . |
| 7-224217 | 8/1995 | Japan . |

*Primary Examiner*—Terressa Mosley
*Attorney, Agent, or Firm*—Nixon & Vanderhye P.C.

[57] ABSTRACT

A permanent anti-static polycarbonate resin composition is comprises
(a) 50–95 parts by weight of an aromatic polycarbonate resin,
(b) 2–40 parts by weight of a block copolyamide resin,
(c) 0–50 parts by weight of an aromatic polyester resin, and
(d) 1–30 parts by weight of a multi-layered polymer having a structure comprising a core composed of a rubber-like polymer prepared from an alkyl acrylate monomer in which the carbon number of the alkyl group is 2–8, and an outer shell layer formed on the surface of the core and composed of a glass-like polymer prepared from an aromatic vinyl monomer or an aromatic vinyl monomer and a vinyl monomer copolymerizable therewith.

20 Claims, No Drawings

PERMANENT ANTI-STATIC POLYCARBONATE RESIN COMPOSITION

BACKGROUND OF THE INVENTION

The present invention relates to a permanent anti-static polycarbonate resin composition. More particularly, the present invention relates to a resin composition having excellent heat and impact resistances and also a drastically improved anti-static property, and a resin composition having heat and impact resistances, an improved anti-static property and also a phenomenally improved weld strength. Owing to its excellent anti-static property, the resin composition of the present invention is usefully applicable to the fields of electric and electronic equipment and precision machinery where durability of anti-static quality is required.

Generally, synthetic polymers have high electric resistivity and are easily charged by a friction such as rubbing, or exfoliation to collect dust and foreign particles, thereby spoiling the appearance of their molded products. Further, in the field of electric and electronic devices composed of these polymers, there often arise troubles causing in such static charging of the polymers. Development of a new polymeric material having an excellent permanent anti-static property has been desired.

Many studies have been performed for endowing anti-static property to the synthetic resin-made articles. Typically, it is known to apply a surfactant-based type anti-static agent on the fabricated article or blend an anti-static agent in the resin material for affording the anti-static property to the article.

The resin composition obtained by these process, however, has a defect that the antistatic agent in the surface layer of the article would be lost in long-time use. The antistatic property would also be lowered with frictional wear of the surface layer.

Regarding polycarbonate resin compositions having anti-static property, Japanese Patent Application laid-open (KOKAI) No. 62-273252 proposes a resin composition comprising a polyether ester amide composed of 10 to 95% of polyether ester units in the whole units and a polycarbonate resin.

Also, Japanese Patent Application laid-open (KOKAI) No. 1-163252 proposes a four-component resin composition consisting of (1) a polyether ester amide composed of 10 to 90 wt % of polyether ester units, (2) a polycarbonate resin, (3) a modified vinyl polymer and a rubber-like polymer and (4) a graft copolymer obtained by graft polymerizing an aromatic vinyl monomer, an acrylic or methacrylic ester monomer or a vinyl cyanide monomer.

Further, Japanese Patent Application laid-open (KOKAI) No. 7-26131 proposes a resin composition consisting of an aromatic polycarbonate, a polyamide-polyether block copolymer, a phosphite-based compound and a core-shell type graft rubber-like elastomer.

The resin compositions disclosed in the above references all show good impact resistance, heat resistance and anti-static property. However, there is no description on weld strength of the compositions in these references. Accordingly, in these references, there is no discussion on durability against frictional wear, nor any consideration to the retention of anti-static property in long-time use.

The present inventors have also pursued studies on the subject matter for a resin composition having permanent anti-static property. In Japanese Patent Application laid-open (KOKAI) No. 7-224217, the present inventors proposed a permanent anti-static resin composition having improved heat stability obtained by adding a compound having a spiro ring structure to polycarbonate, polyester and block copolyamide resins.

The permanent anti-static resin compositions proposed above, although capable of improving anti-static property of the articles to a certain extent, may cause the impairment of the appearance of the polycarbonate resin molded articles and also tend to cause an excessive reduction of strength of the weld portion, for which the block copolyamide resin is responsible, so that these resin compositions are still unsatisfactory for the long-time stable retention of the high-level anti-static quality of the articles.

Thus, there has yet been available no resin composition which can satisfy all of the quality requirement such as improved anti-static property, excellent heat resistance, excellent impact resistance, good appearance of the molded article and excellent weld strength in a well-balanced manner.

As the result of the present inventor's earnest studies and researches on the subject matter, it has been found that by blending an aromatic polycarbonate resin, a block copolyamide resin, an aromatic polyester resin, a specific multi-layered polymer and a phosphorus compound having a spiro ring structure at the specified ratios, the obtained resin composition is drastically improved in anti-static property, can maintain excellent static charge controlling performance even in long-time use, can inhibit the impairment of appearance of the molded article, has an excellent impact resistance, suffers little reduction of heat resistance in use and is greatly improved in weld strength. The present invention has been attained on the basis of the above finding.

SUMMARY OF THE INVENTION

The object of the present invention is to provide a polycarbonate resin composition useful as a permanent anti-static material which is drastically improved in anti-static property, involves no problem of causing impairment of appearance when molded into an article, has an excellent heat resistance and thermal stability, is improved in weld strength and is capable of maintaining excellent static charge controlling performance even in long-time use.

To attain the aim, in a first aspect of the present invention, there is provided a permanent anti-static polycarbonate resin composition comprising:

(a) 50–95 parts by weight of an aromatic polycarbonate resin, (b) 2–40 parts by weight of a block copolyamide resin, (c) 0–50 parts by weight of an aromatic polyester resin, (d) 1–30 parts by weight of a multi-layered polymer having a structure comprising a core composed of a rubber-like polymer prepared from an alkyl acrylate monomer in which the carbon number of the alkyl group is 2–8, and an outer shell layer formed on the surface of the core and composed of a glass-like polymer prepared from an aromatic vinyl monomer or an aromatic vinyl monomer and a vinyl monomer copolymerizable therewith, and (e) a phosphorus-containing compound having a spiro ring structure, the ratio of said compound being 0–1 part by weight based on 100 parts by weight of the mixture composed of the components (a)–(d).

In a second aspect of the present invention, there is provided a permanent anti-static polycarbonate resin composition comprising:

(a) 50–95 parts by weight of an aromatic polycarbonate resin, (b) 2–40 parts by weight of a block copolyamide resin,
(c) 2–50 parts by weight of an aromatic polyester resin,
(d) 1–30 parts by weight of a multi-layered polymer having a structure comprising a core composed of a rubber-like polymer prepared from an alkyl acrylate monomer in which the carbon number of the alkyl group is 2–8, and an outer shell layerformed on the surface of the core and composed of a glass-like polymer prepared from an aromatic vinyl monomer or an aromatic vinyl monomer and a vinyl monomer copolymerizable therewith, and
(e) a phosphorus-containing compound having a spiro ring structure, the ratio of said compound being 0.01–1 part by weight based on 100 parts by weight of the mixture composed of the components (a)–(d).

In a third aspect of the present invention, there is provided a permanent anti-static polycarbonate resin composition comprising:
(a) 50–95 parts by weight of an aromatic polycarbonate resin;
(b) 2–40 parts by weight of a block coplyamide resin;
(c) 0–50 parts by weight of an aromatic polyester resin;
(d) 1–30 parts by weight of a multi-layered polymer having a core composed of a rubber-like polymer formed from an alkyl acrylate polymer in which the carbon number of the alkyl group of the alkyl acrylate monomer is 2–8, and an outermost shell layer formed on the surface therof and composed of a glass-like polymer synthesized from an aromatic vinyl monomer or an aromatic vinyl monomer and a vinyl monomer copolymerizable therewith;
(e) a phosphorus-containing compound having a spiro ring structure, said compound being contained in an amount of 0–1 part by weight based on 100 parts by weight of the mixture composed of said components (a)–(d); and at least one component selected from the group consisting of:
(f) an organic compound having at least two oxazoline rings in the molecule, said organic compound being contained in an amount of not more than 5 parts, preferably 0.02–5 parts by weight based on 100 parts by weight of the resin composition composed of said components (a)–(f);
(g) an aromatic hydrocarbon-formaldehyde resin modified by a modifier having reactivity with the methylol group, methylene ether group or acetal group in said resin, the content of said resin being not more than 5 parts by weight, preferably 0.01–5 parts by weight based on 100 parts by weight of the resin composition composed of said components (a)–(e) and (g); and
(h) a high-molecular weight compound having a weight-average molecular weight of 7,000–100,000 and having the following structure:

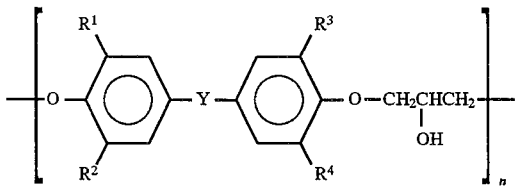

(wherein Y is a C1–C10 alkylene or alkylidene group, a carbonyl group, a —O— group, a —S— group or a —SO$_2$— group, and R$^1$, R$^2$, R$^3$ and R$^4$ are each hydrogen, a C$_1$–C$_5$ alkyl group or a halogen), said high-molecular weight compound being contained in an amount of not more than 30 parts, preferably 1–30 parts by weight based on 100 parts by weight of the resin composition composed of the components (a)–(e) and (h).

In a fourth aspect of the present invention, there is provided a permanent anti-static polycarbonate resin composition comprising:
(a) 50–95 parts by weight of an aromatic polycarbonate resin;
(b) 2–40 parts by weight of a block coplyamide resin;
(c) 2–50 parts by weight of an aromatic polyester resin;
(d) 1–30 parts by weight of a multi-layered polymer having a core composed of a rubber-like polymer formed from an alkyl acrylate polymer in which the carbon number of the alkyl group of the alkyl acrylate monomer is 2–8, and an outermost shell layer formed on the surface therof and composed of a glass-like polymer synthesized from an aromatic vinyl monomer or an aromatic vinyl monomer and a vinyl monomer copolymerizable therewith;
(e) a phosphorus-containing compound having a spiro ring structure, said compound being contained in an amount of 0.01–1 part by weight based on 100 parts by weight of the mixture composed of said components (a)–(d); and at least one component selected from the group consisting of:
(f) an organic compound having at least two oxazoline rings in the molecule, said organic compound being contained in an amount of not more than 5 parts, preferably 0.02–5 parts by weight based on 100 parts by weight of the resin composition composed of said components (a)–(f);
(g) an aromatic hydrocarbon-formaldehyde resin modified by a modifier having reactivity with the methylol group, methylene ether group or acetal group in said resin, the content of said resin being not more than 5 parts by weight, preferably 0.01–5 parts by weight based on 100 parts by weight of the resin composition composed of said components (a)–(e) and (g); and
(h) a high-molecular weight compound having a weight-average molecular weight of 7,000–100,000 and having the following structure:

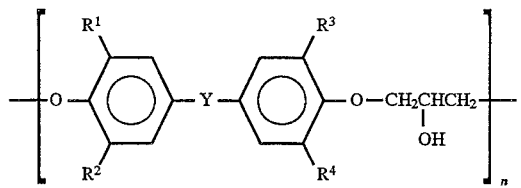

(wherein Y is a C$_1$–C$_{10}$ alkylene or alkylidene group, a carbonyl group, a —O— group, a —S— group or a —SO$_2$— group, and R$^1$, R$^2$, R$^3$ and R$^4$ are each hydrogen, a C$_1$–C$_5$ alkyl group or a halogen), said high-molecular weight compound being contained in an amount of not more than 30 parts, preferably 1–30 parts by weight based on 100 parts by weight of the resin composition composed of the components (a)–(e) and (h).

DETAILED DESCRIPTION OF THE INVENTION

The component (a), an aromatic polycarbonate resin, of the resin composition according to the present invention is not specifically defined as far as it is a polycarbonate ester derived from an aromatic dihydroxyl compound. As the component (a), there can be used, for instance, homopolymers derived from one aromatic dihydroxyl compound, copolymers derived from two or more aromatic dihydroxyl compounds, branched copolymers derived from aromatic dihydroxyl compounds containing a small amount of an aromatic polyhydroxyl compound having three or more hydroxyl groups in the molecule, and end-modified polymers derived from aromatic hydroxyl compounds containing a small amount of an aromatic monohydroxyl compound. It is, of course, possible to use the mixture of two or more of said polymers and copolymers as an aromatic polycarbonate resin (component (a)) in the resin composition of the present invention.

These aromatic polycarbonate resins can be usually obtained by reacting aromatic dihydroxyl compounds or these compounds and a small amount of aromatic polyhydroxyl compounds with phosgene or a carbonic acid diester. The aromatic polycarbonate resins usable in the present invention can be produced by any appropriate method known in the art.

The aromatic dihydroxyl compounds usable for the preparation of said polymers include 2,2-bis(4-hydroxyphenyl) propane (bisphenol A), tetramethylbisphenol A, tetrabromobisphenol A, bis(4-hydroxyphenyl)-p-diisopropylbenzene, hydroquinone, resolcin, 4,4'-dihydroxydiphenyl and the like. Usually, bis(4-hydroxyphenyl)alkane type dihydroxyl compounds are preferably used. Bisphenol A or a combination of bisphenol A and other type of aromatic dihydroxyl compound is especially preferred.

Examples of the aromatic polyhydroxyl compounds usable for obtaining a branched copolymer include phloroglucin, 4,6-dimethyl-2,4,6-tri(4-hydroxyphenyl) heptene-2,4,6-dimethyl-2,4,6-tri(4-hydroxyphenyl)heptane, 2,6-dimethyl-2,4,6-tri(4-hydroxyphenyl)heptene-3, 1,3,5-tri (4-hydroxyphenyl)benzene, 1,1,1-tri(4-hydroxyphenyl) ethane and the like. The precursors of these compounds such as 3,3-bis(4-hydroxyaryl)oxyindol (isatin bisphenol), 5-chloroisatin, 5,7-dichloroisatin and 5-bromoisatin, are also usable. These aromatic polyhydroxyl compounds or their precursors are used in an amount necessary for substituting a part of said dihydroxyl compound, for example 0.1–2 mol % thereof, with a polyhydroxyl compound.

As the hydroxyl compound suited for end modification, namely, the control of molecular weight, there are usually used meta or para substituted phenols such as preferably m-methylphenol, p-methylphenol, m-propylphenol, p-propylphenol, p-tert-butylphenol, alkyl-substituted compounds such as p-long-chain alkyl-substituted phenols, and halogen-substitued compounds such as p-bromophenol.

The molecular weight of the aromatic polycarbonate resin used in the present invention is 10,000–100,000, preferably 15,000–50,000 in terms of viscosity-average molecular weight calculated from the viscosity of a methylene chloride solution at 25° C.

The block copolyamide resin used as component (b) in the composition of the present invention is composed of a polyamide block and a polyether ester block which are linked by an ester bond (—COO—) or an amide bond (—CONH—).

In the present invention, the repeating unit constituting the polyamide block is composed of either (i) an aminocarboxylic acid having 6 or more carbon atoms or a lactam thereof, (ii) a diamine-dicarboxylic acid salt having 6 or more carbon atoms, or (iii) a mixture of (i) and (ii). Typical examples of the repeating units, in the case of (i), include ω-aminocarboxylic acids such as 6-aminocaproic acid, 7-aminoenathic acid, 8-aminocaprylic acid, 9-aminopelargonic acid, 10-aminocapric acid, 11-aminoundecanoic acid, 12-aminododecanoic acid, etc., or ω-lactams such as caprolactam, enantholactam, caprylactam, laurolactam, etc.

In the case of (ii), diamine-dicarboxylic acid salts such as hexamethylenediamine-adipate, hexamethylenediamine-sebacate, hexamethylenediamine-isophthalate and the like can be used. Practically, caprolactam, 12-aminododecanoic acid and hexamethylenediamine-adipate are preferably used.

The repeating unit constituting the polyether ester block is composed of the polyether segment of a poly(alkylene oxide) glycol having the number-average molecular weight of 200–6,000 and a dicarboxylic acid having the carbon number of 4–20. The molar ratio of polyether segment to dicarboxylic acid in the polyether ester block is usually 1:1.

The poly(alkylene oxide) glycols usable here include polyethylene glycol, poly(1,2-propylene oxide) glycol, poly (1,3-propylene oxide) glycol, poly(tetramethylene oxide) glycol, poly(hexamethylene oxide) glycol, ethylene oxide and propylene oxide block or random copolymer, ethylene oxide and tetrahydrofuran block or random copolymer and the like. Of these compounds, polyethylene glycol is preferred because of its excellent static charge controlling property.

As the dicarboxylic acid with a carbon number of 4–20, there can be used, for example, aromatic dicarboxylic acids such as terephthalic acid, isophthalic acid, phthalic acid, naphthalene-2,6-dicarboxylic acid, naphthalene-2,7-dicarboxylic acid, diphenyl-4,4-dicarboxylic acid, diphenoxyethanedicarboxylic acid, sodium 3-sulphoisophthalate, etc., alicyclic dicarboxylic acids such as 1,4-cyclohexanedicarboxylic acid, 1,2-cyclohexanedicarboxylic acid, dicyclohexyl-4,4-dicarboxylic acid, etc., and aliphatic dicarboxylic acids such as succinic acid, oxalic acid, adipic acid, sebacic acid, dodecanedicarboxylic acid, etc. Of the dicarboxylic acids, terephthalic acid, isophthalic acid, 1,4-cyclohexanedicarboxylic acid, adipic acid, sebacic acid and dodecanedicarboxylic acid are preferred in view of polymerizability, color tone of the polymer and physical properties.

In the composition of the present invention, it is important that a block copolyamide resin be allowed to exist throughout the surface layer of the molded article for endowing anti-static property to the article. For this reason, it is preferable that the weight-average molecular weight of the block copolyamide resin is 50,000–200,000, preferably 70,000–120,000. When the weight-average molecular weight of this resin is less than 50,000, the dispersion of said resin in the composition may be instabilized and the anti-static property of the composition may become susceptible to the molding conditions and other factors. On the other hand, when the molecular weight exceeds 200,000, the block copolyamide resin may become incapable of forming the surface layer in the molded article of the composition, resulting in unsatisfactory anti-static effect. Concerning the relation of this block copolyamide resin with other component resins in the composition, it is imperative to select the molecular weights of the respective resins, so that the difference in melt viscosity between the aromatic polycarbonate, aromatic polyester resins and the block copolyamide resin is minimized, thereby inhibiting exfoliation and even under the severe conditions affording the more stabilized anti-static quality.

The block copolyamide resin used in the present invention is preferably of a structure in which the ratio of polyether ester block units account for 95–10 wt % of the whole structural units. When the polyether ester block units exceed 95 wt %, the article surface may be vulnerable to scratch because of low surface hardness and also has low mechanical strength. When the said units are less than 10 wt %, the provided anti-static effect of the resin may be unsatisfactory, and when the block copolyamide resin is added in an amount necessary for providing a satisfactory anti-static effect, the heat resistance and mechanical strength of the composition lower remarkably.

This block copolyamide resin is not subject to restriction by its production method. For example, the following methods can be employed for the polymerization of the block copolyamide: (1) an aminocarboxylic acid or a lactam (x) and a dicarboxylic acid (z) are reacted to form a polyamide prepolymer having carboxyl groups at both molecular ends, and the obtained prepolymer is reacted with poly(alkylene oxide) glycol (y) in vacuo; (2) the compounds (x), (y) and (z) are supplied into a reactor, and the raction is carried out under pressure at 260°–280° C. in the presence or absence of water to produce a carboxyl-terminated polyamide prepolymer, after which the polymerization is carried out under atmospheric or reduced pressure; and (3) said compounds (x), (y) and (z) are supplied simultaneously into a reactor and melted and mixed therein, and then the polymerization is carried out at a stroke in high vacuum (less than 0.5 mmHg).

As the component (c) (aromatic polyester resin) in the composition of the present invention, there can be used the polyesters having an aromatic dicarboxylic acid and a glycol as constituents, which are known as engineering plastics, and the resins mainly composed of such polyesters. The dispersibility of the block copolyamide resin feeding as an anti-static agent is improved by using such an aromatic polyester resin. As a result, the resin composition realize not only the elimination of appearance problems (such as exfoliation) and the improvement of anti-static property but also the inhibition of lowering of weld strength. Usually this polyester resin is selected from the polymers and copolymers obtained from the polycondensation of terephthalic acid, isophthalic acid or its ester-forming derivative with a glycol. Especially polyalkylene terephthalates, such as polyethylene terephthalate (PET) or polybutylene terephthalate (PBT), obtained from the polycondensation of terephthalic acid or its dialkyl esters and aliphatic glycols, or the copolymers mainly composed of such polyalkylene terephthalates are preferably used.

As glycol, there can be used, for instance, ethylene glycol, propylene glycol, tetramethylene glycol, hexamethylene glycol and the like. These aliphatic glycols may be used in combination with small amount of other diols or polyhydric alcohols such as cyclohexanediol, cyclohexanedimethanol, xylene glycol, 2,2-bis(4-hydroxyphenyl)propane, glycerin, pentaerythritol and the like. The amount of these other diols or polyhydric alcohols is preferably not more than 40 parts by weight to 100 parts by weight of the aliphatic glycol.

As aromatic dicarboxylic acid, there can be used, for example, terephthalic acid and its dialkyl ester dimethyl terephthalate, if desired in combination with small amount of other dicarboxylic acids or polyvalent carboxylic acids such as phthalic acid, isophthalic acid, naphthalenedicarboxylic acid, diphenyldicarboxylic acid, adipic acid, sebacic acid, trimellitic acid and their dialkyl esters. The amount of these other carboxylic acids or their esters is preferably not more than 40 parts by weight based on 100 parts by weight of terephthalic acid or its dialkyl ester.

The aromatic polyester resin used in the present invention is preferably one whose number-average molecular weight is 2,000–60,000, more preferably 25,000–52,000.

As component (d) of the composition of the present invention, a multi-layered polymer having a specific structure is used for the purpose of the improving impact resistance, appearance features such as pearl effect and anti-static property of the composition.

Said multi-layered polymer is typified by its structure having a core composed of a rubber-like polymer synthesized from an alkyl acrylate monomer in which the carbon number of the alkyl group of the alkyl acrylate monomer is 2–8, and an outermost shell layer composed of a hard glass-like polymer synthesized from an aromatic vinyl monomer or said monomer and a vinyl monomer copolymerizable therewith. The "hard glass-like polymer" means a glass-like polymer having a glass transition temperature of 50° C. or above.

The monomers usable for preparing said rubber-like polymer include alkyl acrylates in which the alkyl group of its main component ethyl acrylate, n-butyl acrylate, 2-ethylhexyl acrylate or the like has 2–8 carbon atoms, crosslinkable comonomers such as allyl methacrylate, 1,4-butylene glycol diacrylate, divinylbenzene and the like, and other monomers copolymerizable with alkyl acrylates such as methyl methacrylate. The rubber-like polymers used in the present invention are preferably those having a low glass transition temperature such as not more than 0° C., preferably not more than –40° C. The preferred examples of such rubber-like polymers are n-butyl acrylate rubber and 2-ethylhexyl acrylate rubber because of excellent weather and impact resistance.

The examples of the monomers usable for preparing said hard glass-like (amorphous) polymer include aromatic vinyl monomers such as styrene and α-methylstyrene, and vinyl monomers copolymerizable with said aromatic vinyl monomers such as acrylonitrile, methacrylonitrile and methyl methacrylate. If necessary, these monomers may be used in combination with other crosslinkable comonomers such as allyl methacrylate, 1,4-butylene glycol diacrylate and divinylbenzene. As the hard glass-like polymer, usually an acrylonitrile-styrene copolymer or a polystyrene is used in view of its anti-static property improving effect.

The multi-layered polymers in the present invention are not limited to those of two-layer structure comprising a core and an outer shell such as described above, and if necessary, such polymers may have a structure composed of three or more layers. What is important here is the pertinent selection of the components of the core and the outer shell. By properly selecting the core components in the multi-layered structure, an improvement of specific properties of the composition of the present invention can be obtained while maintaining its normal properties.

The multi-layered polymer may have at the center of its core an innermost core composed of an aromatic vinyl polymer or copolymer of said monomer and a vinyl monomer copolymerizable therewith. For example, as described in Japanese Patent Application laid-open (KOKAI) No. 5-222140, a core may be formed by covering an innermost core composed of an aromatic vinyl polymer with a rubber-like polymer having a low glass transition temperature, and covering said core with an outer shell composed of an aromatic vinyl polymer or copolymer of said monomer and a monomer copolymerizable therewith. This type of multi-layered polymer can be favorably used in the present invention since it has an excellent effect for improving the appearance characteristics such as pearl luster.

The outer shell may be composed of multi layers containing said hard glass-like polymer as a component.

The multi-layered polymer having a specific structure according to the present invention can be obtained by a continuous multi-stage seed polymerization process in which a polymer synthesized in a preceding stage is covered with a polymer synthesized in an ensuing stage. Basically, this multi-layered polymer has the core of composed an alkyl acrylate type rubber-like polymer containing a crosslinking substance with a low glass transition temperature, and the outer shell composed of an aromatic vinyl type glass-like polymer endowing an improved adhesiveness to the composition in the matrix.

In the resin composition of the present invention, a phosphorus-containing compound having a spiro ring structure is added as component (e). Addition of such a specific compound provides further improvement of thermal stability of the composition. Generally the compounds represented by the following formula are preferably used as said phosphorus-containing compound having a spiro ring structure:

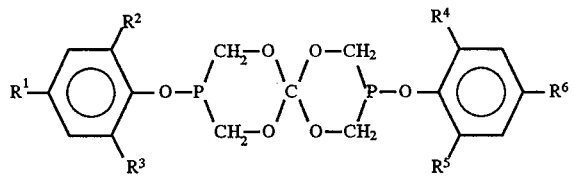

wherein $R^1$ and $R^6$ are each H or a $C_1-C_4$ alkyl group; and $R^2-R^5$ are independently H or a $C_1-C_4$ alkyl group.

Said phosphorus-containing compounds having a spiro ring structure are commercially available, for instance, ADEK STAB PEP-36 and ADK STAB PEP-24G (trade name, produced by Asahi Denka Kogyo K. K.). These compounds are known as a stabilizer effective for inhibiting the reduction of molecular weight of an aromatic polycarbonate resin caused in an ester exchange reaction between an aromatic polycarbonate resin and a polyester resin. In the present invention, by use of this compound with a block copolyamide resin, the heat stability of the resin composition is improved and also heat stability during molding is maintained even when an impact modifier is added.

In the resin composition of the present invention, the ratios of the respective components are defined as follows: aromatic polycarbonate resin (a)=50–95 parts by weight, preferably 70–90 parts by weight; block copolyamide resin (b)=2–40 parts by weight, preferably 5–15 parts by weight; aromatic polyester resin (c)=0–50 parts by weight, preferably 2–50 parts by weight, more preferably 5–30 parts by weight; multi-layered polymer (d)=1–30 parts by weight, preferably 3–10 parts by weight. Further, component (e) is blended in an amount of not more than 1 part by weight, preferably 0.01–1 part by weight, more preferably 0.05–0.5 part by weight based on 100 parts by weight the mixture composed of the components (a), (b), (c) and (d).

In the resin composition of the present invention, if the content of the aromatic polycarbonate resin (a) is too low, the heat resistance is poor. If the content of the aromatic polycarbonate is too high, the anti-static property is unsatisfactory. If the content of the block copolyamide resin (b) is too low, the anti-static property is unsatisfactory. If the content of the block copolyamide resin (b) is too high, the mechanical strength of the resin composition is too soft and deteriorates. If the content of the aromatic polyester resin (c) is too high, the heat resistance is reduced. If the content of the multi-layered polymer (d) is too low, the impact resistance is poor. If the content of the multi-layered polymer (d) is too high, the modulus of elasticity is dropped. If the content of the phosphorus-containing compound having a spiro ring structure (e) is low, the thermal stability of the resin composition lowers. If the content of the phosphorus-containing compound having a spiro ring structure compound (e) is too high, the degree of improvement of thermal stability is limited.

An organic compound (f) having at least two oxazoline rings in the molecule may be added as an optional component to the resin composition of the present invention. Such an organic compound is preferably selected from the compounds represented by the following formula in which each oxazoline ring is linked to an aliphatic or aromatic group:

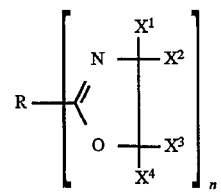

wherein R is an aliphatic, alicyclic, aromatic or heterocyclic hydrocarbon group having a molecular weight of 500 or less; $X^1$, $X^2$, $X^3$ and $X^4$ each represents hydrogen or a $C_1-C_6$ lower alkyl group; and n is an integer of 2 or greater.

Such an organic compound having oxazoline rings is used in the present invention for improving adhesion at the interface between the aromatic polycarbonate or polyester resin forming the matrix of the composition and the block copolyamide resin serving as an anti-static agent. This compound needs to have at least two active sites having reactivity with every component resin, and therefore it is essential that at least two oxazoline rings are present in the molecule. Also, the hydrocarbon group R linking said oxazoline rings should be one having a molecular weight of not more than 500, preferably not more than 300, since a higher molecular weight than 500 results in the relative decrease of the active sites and deterioration the weld strength improving effect.

Such organic compounds having oxazoline rings can be obtained from the condensation of polyvalent carboxylic acids or their derivatives such as acid chlorides and 2-amino-alcohol. The condensate is diversified depending on the type of the polyvalent carboxylic acid used. For example, the dicarboxylic acid type condensates include 1,3-bis(2-oxazoline-2-yl)benzene and 1,3-bis(4,4-dimethyl-2-oxazoline-2-yl)benzene which are derived from isophthalic acid; 1,4- or 1,2-homologues derived from terephthalic or phthalic acid; 1,4-bis(2-oxazoline-2-yl)naphthalene and 1,4-bis(4,4-dimethyl-2-oxazoline-2-yl)naphthalene derived from naphthalenedicarboxylic acids such as naphthalene-1,4-dicarboxylic acid; 1,2-bis(2-oxazoline-2-yl)ethane and 1,2-bis(4,4-dimethyl-2-oxazoline-2-yl)ethane derived from succinic acid; 1,3-bis(2-oxazoline-2-yl) propane and 1,3-bis(4,4-dimethyl-2-oxazoline-2-yl)propane derived from glutaric acid; 1,4-bis(2-oxazoline-2-yl)butane and 1,4-bis(4,4-dimethyl-2-oxazoline-2-yl)butane derived from adipic acid; 1,4-bis(2-oxazoline-2-yl)cyclohexane and 1,4-bis(4,4-dimethyl-2-oxazoline-2-yl)cyclohexane derived from cyclohexane-1,4-dicarboxylic acid; and 2,6-bis(2-oxazoline-2-yl)pyridine and 2,6-bis(4,4-dimethyl-2-oxazoline-2-yl)pyridine derived from pyridine-2,6-dicarboxylic acid. The tricarboxylic acid type condensates include 1,2,4-tris(2-oxazoline-2-yl)benzene derived from trimellitic acid.

The mixing ratio of an organic compound having at least two oxazoline rings in the molecule (f) to 100 parts by weight of the resin composition composed of the components (a)–(f) according to the present invention is not more than 5 parts, preferably 0.02–5 parts by weight, more preferably 0.05–2 parts by weight.

When the content exceeds 5 parts by weight, the decomposition of the polycarbonate resin, block copolyamide resin and polyester resin is promoted.

As an optional component that can be added to the composition of the present invention, a modified aromatic hydrocarbon-formaldehyde resin (g) may be used. Such a modified aromatic hydrocarbon-formaldehyde resin (g) can be obtained by first preparing an aromatic hydrocarbon-formaldehyde resin by reacting an alkylbenzene with formaldehyde preferably in the presence of an acid catalyst, and modifying this resin with a modifier having reactivity with the methylol group (—CH$_2$OH), methylene ether group (—CHO$_2$OCH$_2$—) or acetal group (—CH$_2$(OCH$_2$)$_n$OCH$_2$—)in said resin.

The aromatic hydrocarbon-formaldehyde resin used in the present invention is selected from those resins which have a structure represented by the following formula, are viscous liquid or solid at normal temperature and have a number-average molecular weight not less than 300, preferably not less than 500, more preferably not less than 600:

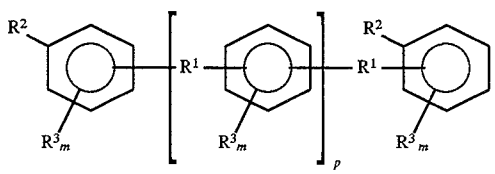

wherein R$^1$'s may be the same or different and each represents a methylene group, a methylene ether group or an acetal group; R$^2$'s may be the same or different and each represents a methylol group, a methylenemethoxy group, an ethylenemethoxy group, a methyleneethoxy group or a dimethylene ether ethoxy group; R$^3$'s may be the same or different and each represents a lower alkyl group; m is an integer from 0 to 3; and p is 0 or an integer.

The example of alkylbenzenes usable as a starting material for said aromatic hydrocarbon-formaldehyde resin include toluene, ethylbenzene, xylenes, methylethylbenzenes and trimethylbenzenes. Of these alkylbenzenes, xylenes and trimethylbenzenes are preferred, and m-xylene, mixed xylene having m-xylene as main component, and 1,3,5-trimethylbenzene are more preferred.

The modifiers usable for modifying the aromatic hydrocarbon-formaldehyde resin in the present invention are one which has reactivity with the methylol group, methylene ether group or acetal group. The usable modifiers are classified as followed.

(1) Phenols: phenol, resorcin, bisphenol A, cresol, o-, m- or p-alkylphenols such as p-tert-butylphenol, and novolaks which are condensates of phenols and formaldehyde.

(2) Aromatic carboxylic acids: benzoic acid, p-hydroxybenzoic acid, p-aminobenzoic acid, phthalic acid, isophthalic acid, terephthalic acid, trimellitic acid, trimellitic anhydride, pyromellitic acid and naphthoic acid.

(3) Saturated or unsaturated aliphatic or alicyclic carboxylic acids: maleic anhydride, fumalic acid, stearic acid, adipic acid, dimeric acid, resin acid, rosin, 3,6-endomethylenetetrahydrophthalic acid, tetrahydroterephthalic acid, lactic acid, glyceric acid, malic acid, tartaric acid, citric acid, and C$_3$–C$_6$ saturated aliphatic hydroxycarboxylic acids such as gluconic acid.

(4) Alcohols: tert-butyl alcohol, ethylene glycol, glycerin, 1,4-tetramethylene glycol, polyethylene glycol, polypropylene glycol, polytetramethylene glycol and xylene glycol.

(5) Amines: aniline, phenylenediamine and xylylenediamine.

(6) Others: aromatic hydrocarbons such as acenaphthene, acenaphthylene and anthracene.

The amount of the modifier used in the modifying aromatic hydrocarbon-formaldehyde resin is variable depending on the type of the modifier, but generally it is used in an amount not more than 8 times, preferably not more than 5 times, more preferably 0.2–2.5 times to the aromatic hydrocarbon-formaldehyde resin by weight. The modifier type and the amount thereof introduced into the resin are preferably so selected that the finally obtained modified aromatic hydrocarbon-formaldehyde resin is a thermoplastic resin having a number-average molecular weight of not less than 500 and a softening point of 60°–200° C.

The mixing ratio of the modified aromatic hydrocarbon-formaldehyde resin (g) to 100 parts by weight of the resin composition (a)–(e) and (g) of the present invention is not more than 5 parts, preferably 0.01–5 parts by weight, more preferably 0.01–2 parts by weight.

When the ratio of (g) exceeds 5 parts by weight, the thermal stability of the produced resin composition may be unsatisfactory.

As another optional component of the composition of the present invention, the high-molecular weight compounds (h) having a weight-average molecular weight of 7,000–100,000, preferably 10,000–80,000, and the structure of the following formula:

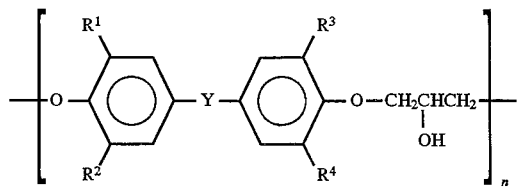

wherein Y is a C$_1$–C$_{10}$ alkylene or alkylidene group, a carbonyl group, a —O— group, a —S— group or a —SO$_2$— group; and R$^1$, R$^2$, R$^3$ and R$^4$ are each hydrogen, a C$_1$–C$_5$ alkyl group or a halogen group. The high-molecular weight compound can be usually obtained by the reaction with aromatic dihydroxyl compounds and epihalohydrins.

Examples of the aromatic dihydroxy compounds usable as a reactant include 2,2-bis(4-hydroxyphenyl)propane (bisphenol A), tetramethylbisphenol A, tetrabromobisphenol A, bis(4-hydroxyphenyl)ketone, bis(4-hydroxyphenyl)ether, bis(4-hydroxyphenyl)sulfide and bis(4-hydroxyphenyl) sulfone. Of these compounds, bisphenol A and tetrabromobisphenol A are preferred. Examples of the epihalohydrins usable as another reactant are epichlorohydrin and epibromohydrin. Usually epichlorohydrin is used. If necessary, two or more types of these reactants may be used jointly.

This high-molecular weight compound (h) is added for improving adhesion at the interface between the aromatic polycarbonate resin forming as a matrix of the composition and the block copolyamide resin used as an anti-static agent. The compound (h) plays a role of a compatibilizing agent. If its molecular weight is too large, the fluidity of the composition may lower while if the molecular weight of the compound (h) is too small, the weld strength may be not improved effectively.

The mixing ratio of the compound (h) to 100 parts by weight of the resin composition composed of the component (a)–(e) and (h) of the present invention is not more than 30 parts, preferably 1–30 parts by weight, more preferably 1–15 parts by weight.

When the mixing ratio is more than 30 parts by weight, the thermal stability of the produced resin composition may be unsatisfactory.

The preparation process of the resin composition of the present invention is not specified; it is possible to employ any appropriate process, for example, a process in which all the component materials, namely an aromatic polycarbonate resin (a), a block copolyamide resin (b), an aromatic polyester resin (c), a multi-layered polymer (d) and a phosphorus-containing compound having a spiro ring structure (e) are melted and mixed all together, or a process in which the components (a) and (b) or (a) and (c) are first melted and mixed, and then the components (c) or (b), (d) and (e) are added, melted and mixed.

In case said optional components (f), (g) and/or (h) are blended, there can also be employed any appropriate process, such as melting and mixing the components (a), (b), (c), (d) and (e) with (f), (g) and/or (h) all together, or first melting and mixing some of the components (a)–(h) and then adding the remaining components, followed by melting and mixing thereof.

The resin composition of the present invention may contain, beside the components described above, various types of stabilizers such as ultraviolet absorber, additives such as pigment, dye, lubricant, flame retardant, release agent, slide improver, etc., and if necessary reinforcements such as glass fiber, glass flakes, carbon fiber, etc., or whiskers of potassium titanate, aluminum borate and the like.

Also, the resin composition of the present invention is not impaired in its antistatic effect even when the surface property improving agents such as release agent, slide improver, etc., are added.

In the resin composition of the present invention, the respective components (a)–(e) are blended in specific ratios carefully determined so as not to impair the peculiar properties of the respective components but to maintain them in a well balanced manner. Consequently, the attenuation is reduced to less than 15 seconds to phenomenally improve the anti-static property of the composition, and accordingly the molded articles thereof are improved in appearance features such as pearl effect and non-exfoliation. Further, by the addition of a compound having a specific structure, the thermal stability and heat resistance of the present resin composition is improved and the weld strength of the molded article is well. Thus, the resin composition of the present invention is expected to find many uses as a permanent antistatic agent.

EXAMPLES

The present invention is further illustrated by the following Examples.

For evaluation of the properties, the pellets of the resin compositions prepared in the Examples and the Comparative Examples were dried at 120° C. for 5 hours and the specified specimens were obtained by the injection-molding of the pellets at a cylinder temperature of 260° C. These specimens were subjected to the evaluation procedures described below.

(1) Anti-static property

Surface resistivity (a) and attenuation (b) were determined as the measure of anti-static property.

(a) Surface resistivity

According to ASTM D-257, the specimen was left under the condition of 23° C. and 50% RH for 7 days and, after conditioning, the surface resistivity of the specimen was measured using an ultra-high resistance meter (mfd. by Advantest Co.). The smaller the measured value of surface resistivity, the better is the anti-static property. In the present invention, it is preferable that the surface resistivity of the resin composition is not higher than $1 \times 10^{13} \Omega$.

(b) Relative value of charge and attenuation

Using a static Honestmeter (mfd. by Shishido Electro Static Ltd.), the specimen was electrically charged at the applied voltage of 7 KV for 30 seconds and the amount of charged electricity (relative value) was measured. Further, the voltage application was cut off and the damping mode of electricity was measured. The term "attenuation" designates the time taken to reach the half-value of the amount of charged electricity (relative value) after the moment of cut-off of voltage application. A smaller value of the attenuation is a better anti-static quality. In the present invention, it is preferable that the attenuation of the composition is not longer than 15 seconds.

(2) Heat deflection temperature

According to ASTM D-648, the heat deflection temperature of a 6.4 mm thick bending test specimen under a high-load condition is measured. In the case of the resin composition of the present invention, it is preferable that the heat deflection temperature is above 110° C.

(3) Izod impact strength

The impact strength of the notched specimen was measured according to ASTM D-256. It is preferable that the product according to the present invention has the izod impact strength of not lower than 70 kg.cm/cm.

(4) Appearance

Pearl luster (a) and exfoliation (b) were examined by visual observation of the molded article. Evaluation was made according to the following criterion.

(a) Pearl luster

Pearl luster was judged to be "present" when a striped pattern appeared on the surface of the specimen, and judged to be "absent" otherwise. In the present invention, it is desirable that no striped pattern appear on the specimen surface.

(b) Exfoliation

Exfoliation was judged to be "present" when the state of mica-like exfoliation was observed near the gate part in the molded article, and judged to be "absent" otherwise. In the present invention, it is desirable that no mica-like exfoliation state be observed on the molded article.

(5) Weld strength

Tensile strength of the dumbbell type specimen was measured according to ASTM D-638. Comparing the tensile strength between the specimen having a weld portion and the specimen having no weld portion, the retention rate was calculated. The greater the value of retention rate, the better. In the present invention, it is preferable that the retention rate is over 60%.

The terms and abbreviations used in the following Examples and Comparative Examples have the following significations.

| Terms & abbreviations | Signification |
| --- | --- |
| 2EHA | 2-ethylhexyl acrylate |
| BA | n-butyl acrylate |
| MMA | methyl methacrylate |
| EA | ethyl acrylate |
| St | styrene |
| AN | acrylonitrile |
| ALMA | allyl methacrylate |
| BGA | 1,4-butylene glycol diacrylate |
| DVB | divinylbenzene |
| DIW | deionized water |
| SSS | sodium dioctylsulfosuccinate |
| SPS | sodium persulfate |
| SHC | sodium hydrogencarbonate |
| E-2000 | Iupilon E-2000 produced by Mitsubishi Gas Chemical Co., Ltd.; poly-4,4'-isopropylidene diphenylcarbonate having a viscosity-average molecular weight of 28,000. |
| PAS-40T | PAS-40T produced by Toray Corp.; polyether block copolyamide having a weight-average molecular weight of 100,000; a 6-nylon and polyethylene glycol diester block copolymer. |
| PEP-36 | ADK STAB PEP-36, a phosphorus-containing compound produced by Asahi Denka Kogyo K.K., represented by the following formula: |

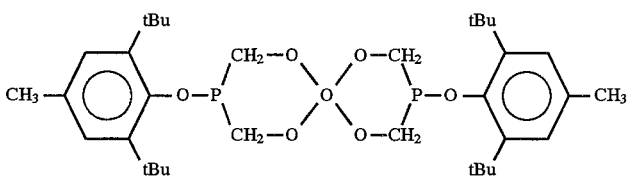

| | |
| --- | --- |
| PA-200 | Diyapet PA-200D produced by Mitsubishi Rayon Co., Ltd.; polyethylene terephthalate having a number-average molecular weight of 51,000. |
| G-1651 | Kraton G-1651, an impact modifier produced by Shell Chemical Co.; hydrogenated SBS. |
| TR-2000 | JSR TR-2000, an impact modifier produced by Nippon Synthetic Rubber Co., Ltd.; SBS. |
| MX-1074 | Pebax MX-1074, produced by Elf Atochem Japan Co., Ltd.; polyether block copolyamide having a weight-average molecular weight of 70,000; a 12-nylon and polyethylene glycol diester block copolymer. |
| MG-1011 | Staphyloid MG-1011, an impact modifier produced by Takeda Chemical Industries Co., Ltd.; core-shell type multi-layered polymer formed from an acrylic ester type graft copolymer. |
| Compound A | 1,3-phenylene-bis-2-oxazoline |
| NIKANOL-A | NIKANOL-A produced by Mitsubishi Gas Chemical Co., Ltd.; terminal carboxyl-modified xylene resin having a number-average molecular weight of 500–600 before modification; number-average molecular weight after modification: 500–600; softening point: 95° C. |
| YP-50 | YP-50, a phenoxy resin produced by Tohto Kasei Co., Ltd.; weight-average molecular weight: 11,260; represented by the following formula: |

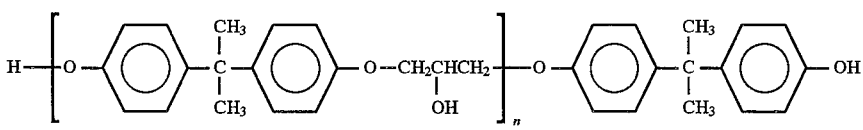

| Terms & abbreviations | Signification |
|---|---|
| YPB-43C | YPB-43C, a phenoxy resin produced by Tohto Kasei Co., Ltd.; weight-average molecular weight: 60,000–80,000; represented by the following formula: |

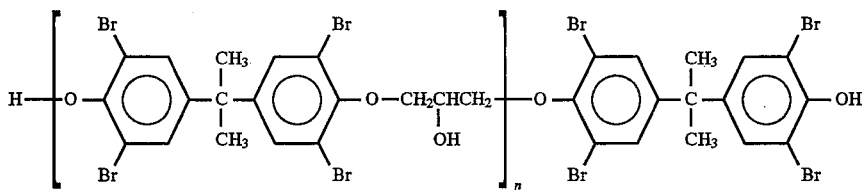

PREPARATION EXAMPLES

The impact modifiers A-1 to A-4 (multi-layered polymers) used in the following Examples were prepared according to the processes shown in the following Preparation Examples 1–4. The weight-average particle diameter of the multi-layered polymers obtained in the Preparation Examples was measured by a laser particle diameter analytical system LPA-3000 (mfd. by Ohtsuka Denshi K. K.)

Preparation Example 1

First, 120 g of DIWI, 32 g of a 1% SSS solution and 80 g of a 1% SHC solution were supplied into a 5-liters polymerizer equipped with a reflux condenser and heated to 70° C. under reflux under a nitrogen stream. Then 80 g of EA was added and dispersed over a period of 10 minutes, followed by the addition of 160 g of a 2% SP solution to start seed polymerization.

The polymerization mixture was heated to 70° C. and 2,027 g of the first stage monomeric emulsifier of the following feed amount was supplied continuously over a period of 180 minutes, and the polymerization was continued for one hour at 80° C.

| Feed amount of the first-stage monomer emulsion | |
|---|---|
| BA | 1,315 g |
| BGA | 2.5 g |
| ALMA | 2.5 g |
| 1% SSS solution | 532 g |
| 1% SHC solution | 70 g |
| DIW | 105 g |

Then 30 g of a 2% SPS solution was added and thereafter 540 g of the second stage monomeric emulsifier of the following feed amount was added over a period of 60 minutes to carry out second-stage polymerization at 80° C., and the polymerization was continued for one hour at 80° C.

| Feed amount of the second-stage monomer emulsion | |
|---|---|
| MMA | 299.8 g |
| BGA | 0.6 g |
| ALMA | 0.6 g |
| 1% SSS solution | 120 g |
| 1% SHC solution | 30 g |
| DIW | 90 g |

Then 25 g of a 2% SPS solution was added, after which 525 g of the third stage monomeric emulsifier of the following feed amount was added over a period of 60 minutes to carry out third-stage polymerization at 75° C. and the polymerization was continued for one hour 80° C.

| Feed amount of the third-stage monomer emulsion | |
|---|---|
| St | 225 g |
| AN | 75 g |
| 1% SSS solution | 100 g |
| 1% SHC solution | 25 g |
| DIW | 100 g |

After the polymerization, the reaction mixture was cooled to room temperature and filtered by a 300-mesh stainless screen to obtain a multi-layered polymer latex having the weight-average particle diameter of 286 nm. This latex was subjected by freeze and thawing method, washed with water, dehydrated and then dried to obtain an impact modifier A-1 (multi-layered polymer).

Preparation Examples 2–4

The same procedure of emulsion polymerization as in Preparation Example 1 was carried out using the materials listed in Table 1, and the obtained latices were freeze and thawing method, washed with water, dehydrated and dried to obtain the impact modifiers A-2 to A-4 (multi-layered polymers).

TABLE 1

| Composition (by weight) | A-1 | A-2 | A-3 | A-4 |
|---|---|---|---|---|
| Multi-layered structure | | | | |
| Core layer | 70 | 30 | 70 | 80 |
| Rubber-like intermediate layer | | 55 | | |
| Hard intermediate layer | 15 | | 15 | 55 |
| Outermost layer | 15 | 15 | 15 | 20 |
| Monomer feed ratio (by weight) | | | | |
| Core layer | | | | |
| 2EHA | | | 94 | |
| BA | 94 | | | 94 |
| EA | 5.6 | | 5.6 | 5.6 |
| St | | 83 | | |
| MMA | | 7.5 | | |
| BGA | 0.2 | | 0.2 | 0.2 |
| DVB | | 9 | | |

TABLE 1-continued

| Composition (by weight) | A-1 | A-2 | A-3 | A-4 |
|---|---|---|---|---|
| ALMA | 0.2 | 0.5 | 0.2 | 0.2 |
| Rubber-like intermediate layer | | | | |
| BA | | 96.5 | | |
| DVB | | 1.5 | | |
| ALMA | | 2 | | |
| Hard intermediate layer | | | | |
| MMA | 99.6 | | 99.6 | |
| BGA | 0.2 | | 0.2 | |
| ALMA | 0.2 | | 0.2 | |
| Outermost layer | | | | |
| St | 75 | 60 | 100 | |
| AN | 25 | 25 | | |
| MMA | | | | 100 |
| DVB | | 15 | | | and the amount of A-1 was changed to 10 wt parts, to obtain the pellets. The resin composition of the pellets and the results of property evaluation are listed in Table 2.

Example 4

The same procedure as in Example 1 was carried out except that the impact modifier was changed from A-1 to A-2, to obtain the pellets. The resin composition of the pellets and the results of property evaluation are listed in Table 2.

Example 5

The same procedure as in Example 1 was carried out except that the impact modifier was changed from A-1 to A-3, to obtain the pellets. The resin composition of the pellets and the results of property evaluation are listed in Table 2.

TABLE 2

| Composition | | Ex. 1 | Ex. 2 | Ex. 3 | Ex. 4 | Ex. 5 |
|---|---|---|---|---|---|---|
| Polycarbonate | E-2000 | 70 | 50 | 65 | 70 | 70 |
| Polyester | PA-200 | 15 | 15 | 15 | 15 | 15 |
| Block copolyamide | PAS-40T | 10 | 30 | 10 | 10 | 10 |
| Impact modifier | A-1 | 5 | 5 | 10 | | |
| Impact modifier | A-2 | | | | 5 | |
| Impact modifier | A-3 | | | | | 5 |
| Phosphorous-containing compound | PEP-30 | 0.1 | 0.1 | 0.1 | 0.1 | 0.1 |
| Properties | unit | | | | | |
| Surface resistivity | $10^{12}$ Ω | 2.4 | 1.2 | 1.0 | 3.0 | 3.0 |
| Relative value of charged electricity | | 36 | 36 | 36 | 36 | 36 |
| Half-value period | sec | 8 | 2 | 5 | 8 | 8 |
| Heat deflection temperature | °C. | 118 | 116 | 118 | 119 | 119 |
| Izod impact strength | kg · cm/cm | 75 | 70 | 90 | 70 | 71 |
| Pearl luster | | Absent | Absent | Absent | Absent | Absent |
| Exfoliation | | Absent | Absent | Absent | Absent | Absent |

Example 1

| (a) Aromatic polycarbonate resin E-2000 | 70 wt parts |
|---|---|
| (b) Block copolyamide resin PAS-40T | 10 wt parts |
| (c) Polyethylene terephthalate PA-200 | 15 wt parts |
| (d) Impact modifier A-1 | 5 wt parts |
| (e) Stabilizer PEP-36 | 0.1 wt part |

The above materials were blended for 20 minutes by a tumbler and then extruded using a double-screw extruder at a cylinder temperature of 260° C. to obtain a resin composition pellets.

The resin composition of the obtained pellets and the results of property evaluation thereof are listed in Table 2.

Example 2

The same procedure as in Example 1 was carried out except that the amount of E-2000 was changed to 50 wt parts and the amount of PAS-40T was changed to 30 wt parts, to obtain the pellets. The resin composition of the pellets and the results of property evaluation are listed in Table 2.

Example 3

The same procedure as in Example 1 was carried out except that the amount of E-2000 was changed to 65 wt parts Comparative Example 1

The same procedure as in Example 1 was carried out except for nonuse of impact modifier A-1, to obtain the pellets. The resin composition of the pellets and the results of property evaluation are listed in Table 3.

From comparison with Example 1, it is seen that the attenuation and izod impact strength of the product of Comparative Example 1 is too long and too low, respectively.

Comparative Example 2

The same procedure as in Example Example 1 was carried out except that the impact modifier Was changed from A-1 to A-4, to obtain the pellets. The resin compositions of the pellets and the results of property evaluation are listed in Table 3.

It is seen that the attenuation of the product of Comparative Example 2 is too long in comparison with Example 1.

Comparative Example 3

The same procedure as in Example 1 was carried out except that the impact modifier was changed from A-1 to G-1651, to obtain the pellets. The resin composition of the pellets and the results of property evaluation are listed in Table 3.

It is seen that the attenuation of the product of Comparative Example 3 is too long in comparison with Example 1.

Comparative Example 4

The same procedure as in Example 1 was carried out except that the impact modifier was changed from A-1 to TR-2000, to obtain the pellets. The resin composition of the pellets and the results of property evaluation are listed in Table 3.

It is seen that the attenuation of the product of Comparative Example 4 is too long in comparison with Example 1.

used in an amount of 75 parts by weight and that the multi-layered polymer MG-1011 (d) was not used, to obtain the pellets.

The resin composition of the pellets and the results of property evaluation thereof are listed in Table 4.

TABLE 3

| Composition | | Comp. Ex. 1 | Comp. Ex. 2 | Comp. Ex. 3 | Comp. Ex. 4 |
|---|---|---|---|---|---|
| Polycarbonate | E-2000 | 75 | 70 | 70 | 70 |
| Polyester | PA-200 | 15 | 15 | 15 | 15 |
| Block copolyamide | PAS-40T | 10 | 10 | 10 | 10 |
| Impact modifier | A-4 | | 5 | | |
| Impact modifier | G-1651 | | | 5 | |
| Impact modifier | TR-2000 | | | | 5 |
| Phosphorous-containing compound | PEP-36 | 0.1 | 0.1 | 0.1 | 0.1 |
| Properties | unit | | | | |
| Surface resistivity | $10^{12}$ Ω | 46 | 73 | 60 | 82 |
| Relative value of charged electricity | | 36 | 38 | 38 | 39 |
| Half-value period | sec | 29 | 26 | 31 | 35 |
| Heat deflection temperature | °C. | 126 | 119 | 118 | 118 |
| Izod impact strength | kg · cm/cm | 50 | 70 | 70 | 70 |
| Pearl luster | | Present | Present | Present | Present |
| Exfoliation | | Present | Absent | Present | Present |

Example 6

| (a) Aromatic polycarbonate resin E-2000 | 70 wt parts |
|---|---|
| (b) Block copolyamide resin PAS-40T | 10 wt parts |
| (c) Polyethylene terephthalate PA-200 | 15 wt parts |
| (d) Multi-layered polymer MG-1011 | 5 wt parts |
| (e) Phosphite-based antioxidant PEP-36 | 0.05 wt part |

The above materials were blended for 20 minutes by a tumbler and then extruded using a double-screw extruder at a cylinder temperature of 260° C. to obtain a resin composition pellets.

The resin composition of the pellets and the results of property evaluation thereof are listed in Table 4.

Example 7

The same procedure as in Example 6 was carried out except the type of block copolyamide resin (b) was changed from PAS-40T to MX-1074, to obtain the pellets.

The resin composition of the pellets and the results of property evaluation thereof are listed in Table 4.

Comparative Example 5

The same procedure as in Example 6 was carried out using the following materials, to obtain the pellets:

| (a) Aromatic polycarbonate resin E-2000 | 90 wt parts |
|---|---|
| (b) Block copolyamide resin PAS-40T | 10 wt parts |
| (c) Phosphorus-containing compound having a spiro ring structure PEP-36 | 0.05 wt part |

The resin composition of the pellets and the results of property evaluation thereof are listed in Table 4.

Comparative Example 6

The same procedure as in Example 6 was carried out except that the aromatic polycarbonate resin E-2000 (a) was

TABLE 4

| Composition | | Comp. Ex. 5 | Comp. Ex. 6 | Example 6 | Example 7 |
|---|---|---|---|---|---|
| Polycarbonate | E-2000 | 90 | 75 | 70 | 70 |
| Polyester | PA-200 | | 15 | 15 | 15 |
| Block copolyamide | PAS-40T | 10 | 10 | 10 | |
| Block copolyamide | MX-1074 | | | | 10 |
| Impact modifier | MG-1011 | | | 5 | 5 |
| Phosphorous-containing compound | PEP-36 | 0.05 | 0.05 | 0.05 | 0.05 |
| Properties | unit | | | | |
| Surface resistivity | $10^{13}$ Ω | 1.8 | 4.6 | 0.30 | 0.78 |
| Half-value period | sec | 114 | 29 | 8 | 12 |
| Izod impact strength | kg · cm/cm | 70 | 50 | 80 | 75 |
| Tensile strength | | | | | |
| Weld portion is absent | kg/cm² | 490 | 520 | 550 | 580 |
| Weld portion is present | kg/cm² | 240 | 260 | 270 | 270 |
| Retention | % | 49 | 50 | 49 | 46 |

Example 8

| (a) Aromatic polycarbonate resin E-2000 | 70 wt parts |
|---|---|
| (b) Block copolyamide resin PAS-40T | 10 wt parts |
| (c) Polyethylene terephthalate PA-200 | 15 wt parts |
| (d) Impact modifier MG-1011 | 5 wt parts |
| (e) Phosphite-based antioxidant PEP-36 | 0.05 wt part |
| (f) Compound A having oxazoline rings | 0.05 wt part |

The above materials were blended for 20 minutes by a tumbler and then extruded using a double-screw extruder at a cylinder temperature of 260° C., to obtain a resin composition pellets.

The resin composition of the pellets and the results of property evaluation are listed in Table 5.

Example 9

The same procedure as in Example 8 was carried out except that the type of the block copolyamide resin (b) was changed from PAS-40T to MX-1074, to obtain the pellets.

The resin composition of the pellets and the results of property evaluation are listed in Table 5.

| Composition | | Example 8 | Example 9 |
|---|---|---|---|
| Polycarbonate | E-2000 | 70 | 70 |
| Polyester | PA-200 | 15 | 15 |
| Block copolyamide | PAS-40T | 10 | |
| Block copolyamide | MX-1074 | | 10 |
| Impact modifier | MG-1011 | 5 | 5 |
| Phosphorous-containing compound | PEP-36 | 0.05 | 0.05 |
| Compound | A | 0.05 | 0.05 |
| Properties | unit | | |
| Surface resistivity | $10^{13}$ Ω | 0.28 | 0.35 |
| Half-value period | sec | 5 | 10 |
| Izod impact strength | kg · cm/cm | 98 | 80 |
| Tensile strength | | | |
| Weld portion is absent | kg/cm$^2$ | 520 | 540 |
| Weld portion is present | kg/cm$^2$ | 350 | 370 |
| Retention | % | 67 | 68 |

Example 10

| | | | |
|---|---|---|---|
| (a) Aromatic polycarbonate resin E-2000 | | 69.5 | wt parts |
| (b) Block copolyamide resin PAS-40T | | 10 | wt parts |
| (c) Polyethylene terephthalate PA-200 | | 15 | wt parts |
| (d) Impact modifier MG-1011 | | 5 | wt parts |
| (e) Phosphite-based antioxidant PEP-36 | | 0.05 | wt part |
| (f) Terminal carboxyl-modified xylene resin NIKANOL-A | | 0.5 | wt part |

The above materials were blended for 20 minutes by a tumbler and then extruded using a double-screw extruder at a cylinder temperature of 260° C., to obtain a resin composition pellets.

The resin composition of the pellets and the results of property evaluation are listed in Table 6.

TABLE 6

| Composition | | Example 10 |
|---|---|---|
| Polycarbonate | E-2000 | 69.5 |
| Polyester | PA-200 | 15 |
| Block copolyamide | PAS-40T | 10 |
| Impact modifier | MG-1011 | 5 |
| Phosphorous-containing compound | PEP-36 | 0.05 |
| Xylene resin | NIKANOL-A | 0.5 |
| Properties | unit | |
| Surface resistivity | $10^{13}$ Ω | 0.20 |
| Half-value period | sec | 6 |
| Izod impact strength | kg · cm/cm | 85 |
| Tensile strength | | |
| Weld portion is absent | kg/cm$^2$ | 510 |

TABLE 6-continued

| Composition | | Example 10 |
|---|---|---|
| Weld portion is present | kg/cm$^2$ | 360 |
| Retention | % | 71 |

Example 11

| | | |
|---|---|---|
| (a) Aromatic polycarbonate resin E-2000 | 67 | wt parts |
| (b) Block copolyamide resin PAS-40T | 10 | wt parts |
| (c) Polyethylene terephthalate PA-200 | 15 | wt parts |
| (d) Impact modifier MG-1011 | 5 | wt parts |
| (e) Phosphite-based antioxidant PEP-36 | 0.05 | wt part |
| (f) High-molecular weight compound YP-50 | 3 | wt parts |

The above materials were blended for 20 minutes by a tumbler and then extruded using a double-screw extruder at a cylinder temperature of 260° C., to obtain a resin composition pellets.

The resin composition of the pellets and the results of property evaluation are listed in Table 7.

TABLE 7

| Composition | | Example 11 |
|---|---|---|
| Polycarbonate | E-2000 | 67 |
| Polyester | PA-200 | 15 |
| Block copolyamide | PAS-40T | 10 |
| Impact modifier | MG-1011 | 5 |
| Phosphorous-containing compound | PEP-36 | 0.05 |
| High-molecular weight compound | YP-50 | 3 |
| Properties | unit | |
| Surface resistivity | $10^{13}$ Ω | 0.13 |
| Half-value period | sec | 5 |
| Izod impact strength | kg · cm/cm | 80 |
| Tensile strength | | |
| Weld portion is absent | kg/cm$^2$ | 530 |
| Weld portion is present | kg/cm$^2$ | 380 |
| Retention | % | 72 |

Example 12

| | | |
|---|---|---|
| (a) Aromatic polycarbonate resin E-2000 | 55 | wt parts |
| (b) Block copolyamide resin PAS-40T | 10 | wt parts |
| (c) Polyethylene terephthalate PA-200 | 15 | wt parts |
| (d) Impact modifier MG-1011 | 5 | wt parts |
| (e) Phosphite-based antioxidant PEP-36 | 0.05 | wt part |
| (f) High-molecular weight compound YPB-43C | 15 | wt parts |

The above materials were blended for 20 minutes by a tumbler and then extruded using a double-screw extruder at a cylinder temperature of 260° C., to obtain a resin composition pellets.

The resin composition of the pellets and the results of property evaluation are listed in Table 8.

TABLE 8

| Composition | | Example 12 |
|---|---|---|
| Polycarbonate | E-2000 | 55 |
| Polyester | PA-200 | 15 |
| Block copolyamide | PAS-40T | 10 |
| Impact modifier | MG-1011 | 5 |
| Phosphorous-containing compound | PEP-36 | 0.05 |
| High-molecular weight compound | YPB-43C | 15 |
| Properties | unit | |
| Surface resistivity | $10^{13}$ Ω | 0.15 |
| Half-value period | sec | 3 |
| Izod impact strength | kg · cm/cm | 70 |
| Tensile strength | | |
| Weld portion is absent | kg/cm$^2$ | 530 |
| Weld portion is present | kg/cm$^2$ | 350 |
| Retention | % | 66 |

What is claimed is:

1. A permanent anti-static polycarbonate resin composition comprising:

(a) 50–95 parts by weight of an aromatic polycarbonate resin, (b) 2–40 parts by weight of a block copolyamide resin, (c) 2–50 parts by weight of an aromatic polyester resin, and (d) 1–30 parts by weight of a multi-layered polymer having a structure comprising a core composed of a rubber-like polymer prepared from an alkyl acrylate monomer in which the carbon number of the alkyl group is 2–8, and an outer shell layer formed on the surface of the core and composed of a glass-like polymer prepared from an aromatic vinyl monomer or an aromatic vinyl monomer and a vinyl monomer copolymerizable therewith.

2. A permanent anti-static polycarbonate resin composition according to claim 1, further containing (e) a phosphorus-containing compound having a spiro ring structure, the ratio of said compound being 0.01–1 part by weight based on 100 parts by weight of the mixture composed of the components (a)–(d).

3. A permanent anti-static polycarbonate resin composition according to claim 1, further containing at least one component selected from the group consisting of:

(f) an organic compound having two or more oxazoline rings in the molecule, the content of said compound being 0.02–5 parts by weight based on the resin composition composed of the components (a)–(f);

(g) a modified aromatic hydrocarbon-formaldehyde resin obtained by modifying an aromatic hydrocarbon-formaldehyde resin with a modifier having reactivity to the methylol group, methylene ether group or acetal group in said resin, the content of said modified aromatic hydrocarbon-formaldehyde resin being 0.01–5 parts by weight based on the resin composition composed of the components(a)–(e) and (g); and (h) a high-molecular weight compound having the weight-average molecular weight of 7,000–100,000 and having the following structure

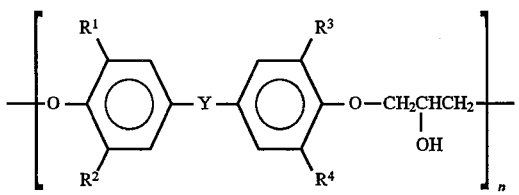

wherein Y represents a $C_1$–$C_{10}$ alkylene or alkylidene group, a carbonyl group, a —O— group, a —S— group or a —SO$_2$— group, and $R^1$, $R^2$, $R^3$ and $R^4$ represent a hydrogen, a $C_1$–$C_5$ alkyl group or a halogen group, the content of said compound being 1–30 parts by weight based on the resin composition (a)–(e) and (h).

4. A permanent anti-static polycarbonate resin composition according to claim 1, comprising:

(a) 50–95 parts by weight of an aromatic polycarbonate resin, (b) 2–40 parts by weight of a block copolyamide resin, (c) 2–50 parts by weight of an aromatic polyester resin, (d) 1–30 parts by weight of a multi-layered polymer having a structure comprising a core composed of a rubber-like polymer prepared from an alkyl acrylate monomer in which the carbon number of the alkyl group is 2–8, and an outer shell layer formed on the surface of the core and composed of a glass-like polymer prepared from an aromatic vinyl monomer or an aromatic vinyl monomer and a vinyl monomer copolymerizable therewith, and (e) a phosphorus-containing compound having a spiro ring structure, the ratio of said compound being 0.01–1 part by weight based on 100 parts by weight of the mixture composed of the components (a)–(d).

5. A permanent anti-static polycarbonate resin composition according to claim 4, wherein said core of said multi-layered polymer (d) comprises an inner core prepared from an aromatic vinyl monomer or an aromatic vinyl monomer and a vinyl monomer copolymerizable therewith, and an inner shell composed of a rubber-like polymer covering said inner core, said rubber-like polymer being prepared from an alkyl acrylate monomer in which the carbon number of the alkyl group is 2–8.

6. A permanent anti-static polycarbonate resin composition according to claim 4, wherein said rubber-like polymer forming the core of said multi-layered polymer (d) comprises the homopolymer of ethyl acrylate, n-butyl acrylate or 2-ethylhexyl acrylate, or the copolymer of one of these monomers and allyl methacrylate, 1,4-butylene glycol diacrylate, divinylbenzene or methyl methacrylate.

7. A permanent anti-static polycarbonate resin composition according to claim 4, wherein said outer shell of said multi-layered polymer (d) comprises two or more layers formed a glass-like polymer.

8. A permanent anti-static polycarbonate resin composition according to claim 4, wherein said outer shell of said multi-layered polymer (d) comprises the homopolymer or a copolymer of styrene, α-methylstyrene, acrylonitrile, methacrylonitrile or methyl methacrylate, or the copolymer of one of said monomers and allyl methacrylate, 1,4-butylene glycol diacrylate or divinylbenzene.

9. A permanent anti-static polycarbonate resin composition according to claim 4, wherein said aromatic polycarbonate resin (a) is a polycarbonate produced from 2,2-bis(4-hydroxyphenyl)propane or derivative thereof, or a polycarbonate copolymer produced from 2,2-bis(4-hydroxyphenyl)propane and other aromatic dihydroxyl compound.

10. A permanent anti-static polycarbonate resin composition according to claim 4, wherein said viscosity-average molecular weight of the aromatic polycarbonate resin (a) is 10,000–100,000.

11. A permanent anti-static polycarbonate resin composition according to claim 4, wherein said weight-average molecular weight of the block copolyamide resin (b) is 50,000–200,000.

12. A permanent anti-static polycarbonate resin composition according to claim 4, wherein said block copolyamide resin (b) is composed of the polyamide blocks having as their constituent unit an aminocarboxylic acid with a carbon number of not less than 6, a lactam thereof, a diamine-dicarboxylic acid salt having not less than 6 carbon atoms, or a mixture thereof and the polyether ester blocks having as their constituent unit a poly(alkylene oxide) glycol having the number-average molecular weight of 200–6,000 and a dicarboxylic acid having 4–20 carbon atoms.

13. A permanent anti-static polycarbonate resin composition according to claim 4, wherein said aromatic polyester resin (c) is polymers or copolymers obtained from the polycondensation of terephthalic acid, isophthalic acid or its ester forming derivatives thereof which have an ability of ester formation and glycols.

14. A permanent anti-static polycarbonate resin composition according to claim 4, wherein said weight-average molecular weight of the aromatic polyester resin (c) is 2,000–60,000.

15. A permanent anti-static polycarbonate resin composition according to claim 4, wherein said phosphorus-containing compound having a spiro ring structure (e) has the following structure:

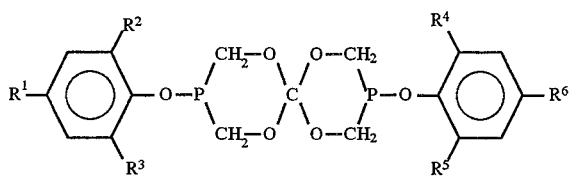

wherein $R^1$ and $R^6$ represent a hydrogen or a $C_1$–$C_4$ alkyl group, and $R^2$ to $R^5$ represent independently a hydrogen or a $C_1$–$C_4$ alkyl group.

16. A permanent anti-static polycarbonate resin composition according to claim 4, further containing at least one component selected from the group consisting of:

(f) an organic compound having two or more oxazoline rings in the molecule, the content of said compound being 0.02–5 parts by weight based on the resin composition composed of the components (a)–(f);

(g) a modified aromatic hydrocarbon-formaldehyde resin obtained by modifying an aromatic hydrocarbon-formaldehyde resin with a modifier having reactivity to the methylol group, methylene ether group or acetal group in said resin, the content of said modified aromatic hydrocarbon-formaldehyde resin being 0.01–5 parts by weight based on the resin composition composed of the components(a)–(e) and (g); and (h) a high-molecular weight compound having the weight-average molecular weight of 7,000–100,000 and having the following structure:

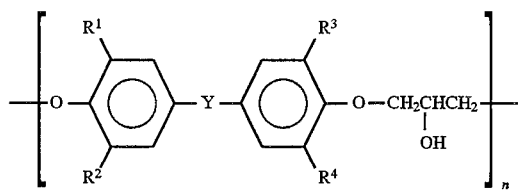

wherein Y represents a $C_1$–$C_{10}$ alkylene or alkylidene group, a carbonyl group, a —O— group, a —S— group or a —SO$_2$— group, and $R^1$, $R^2$, $R^3$ and $R^4$ represent a hydrogen, a $C_1$–$C_5$ alkyl group or a halogen group, the content of said compound being 1–30 parts by weight based on the resin composition (a)–(e) and (h).

17. A permanent anti-static polycarbonate resin composition according to claim 4, wherein said organic compound having two or more oxazoline rings in the molecule (f) is an organic compound represented by the following formula:

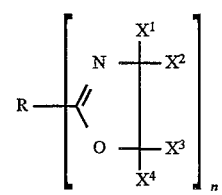

wherein R represents an aliphatic, alicyclic, aromatic or heterocyclic hydrocarbon group having the molecular weight of 500 or less, $X^1$, $X^2$, $X^3$ and $X^4$ represent a hydrogen or a $C_{1-C6}$ lower alkyl group, and n is an integer of 2 or greater.

18. A permanent anti-static polycarbonate resin composition according to claim 4, wherein in said modified aromatic hydrocarbon-formaldehyde resin (g), the aromatic hydrocarbon comprises toluene, ethylbenzene, xylene, methylethylbenzene or trimethylbenzene.

19. A permanent anti-static polycarbonate resin composition according to claim 1, wherein the content of the aromatic polyester resin (c) is 2–30 parts by weight based on the weight of said resin composition.

20. A permanent anti-static polycarbonate resin composition according to claim 4, wherein the content of the aromatic polyester resin (c) is 2–30 parts by weight based on the weight of said resin composition.

* * * * *